US012013350B2

(12) United States Patent
Heidrich et al.

(10) Patent No.: US 12,013,350 B2
(45) Date of Patent: Jun. 18, 2024

(54) EFFECTIVE CELL APPROXIMATION MODEL FOR LOGIC STRUCTURES

(71) Applicant: Onto Innovation Inc., Wilmington, MA (US)

(72) Inventors: Kevin Eduard Heidrich, Beaverton, OR (US); Nicholas James Keller, La Jolla, CA (US)

(73) Assignee: Onto Innovation Inc., Wilmington, MA (US)

( * ) Notice: Subject to any disclaimer, the term of this patent is extended or adjusted under 35 U.S.C. 154(b) by 379 days.

(21) Appl. No.: 17/308,949

(22) Filed: May 5, 2021

(65) Prior Publication Data
US 2022/0357286 A1  Nov. 10, 2022

(51) Int. Cl.
*G01N 21/956* (2006.01)
*G01N 21/21* (2006.01)
(Continued)

(52) U.S. Cl.
CPC ..... *G01N 21/95607* (2013.01); *G01N 21/211* (2013.01); *G01N 21/9501* (2013.01);
(Continued)

(58) Field of Classification Search
CPC .............. G06F 30/347; G06F 30/3308; G01N 21/211; G01N 21/9501; G01N 2021/95615
(Continued)

(56) References Cited

U.S. PATENT DOCUMENTS

| 4,472,633 | A | * | 9/1984 | Motooka | G01N 21/211 |
| | | | | | 250/341.4 |
| 5,042,951 | A | * | 8/1991 | Gold | G03F 7/70633 |
| | | | | | 356/369 |

(Continued)

FOREIGN PATENT DOCUMENTS

| TW | 201211789 A | 11/2015 |
| TW | I671501 B | 9/2019 |

OTHER PUBLICATIONS

Chen et al., "Application of Spectroscopic Ellipsometry-based Scatterometry for Ultrathin Spacer Structure", www.kla-tencor.com/magazine, Summer 2004, 5 pgs.

(Continued)

*Primary Examiner* — Michael A Lyons
*Assistant Examiner* — Omar H Nixon
(74) *Attorney, Agent, or Firm* — Paradice & Li LLP (57) ABSTRACT

Characteristics of a standard logic cell, e.g., a random logic cell, are determined using an effective cell approximation. The effective cell approximation is smaller than the standard logic cell and represents the density of lines and spaces of the standard logic cell. The effective cell approximation may be produced based on a selected area from the standard logic cell and include the same non-periodic patterns as the selected area. The effective cell approximation, alternatively, may represent non-periodic patterns in the standard logic cell using periodic patterns having a same density of lines and spaces as found in the standard logic cell. A structure on the sample, such as a logic cell or a metrology (Continued)

target produced based on the effective cell approximation is measured to acquire data, which is compared to the data for the effective cell approximation to determine a characteristic of the standard logic cell.

20 Claims, 8 Drawing Sheets

(51) Int. Cl.
  *G01N 21/95* (2006.01)
  *G06F 30/3308* (2020.01)
  *G06F 30/347* (2020.01)

(52) U.S. Cl.
  CPC ........ *G06F 30/3308* (2020.01); *G06F 30/347* (2020.01); *G01N 2021/95615* (2013.01)

(58) Field of Classification Search
  USPC ......................................................... 356/301
  See application file for complete search history.

(56) References Cited

U.S. PATENT DOCUMENTS

| | | |
|---|---|---|
| 5,472,814 A | 12/1995 | Lin |
| 5,963,329 A | 10/1999 | Conrad et al. |
| 6,362,414 B1 | 3/2002 | Fujisawa et al. |
| 6,483,580 B1 | 11/2002 | Xu et al. |
| 6,485,872 B1 | 11/2002 | Rosenthal et al. |
| 6,654,108 B2 | 11/2003 | Ravid et al. |
| 6,720,568 B2 | 4/2004 | Finarov et al. |
| 6,940,592 B2 | 9/2005 | Borden et al. |
| 7,202,958 B1 | 4/2007 | McGahan |
| 7,379,192 B2 | 5/2008 | Bischoff et al. |
| 8,126,694 B2 | 2/2012 | Liu et al. |
| 8,486,589 B2 | 7/2013 | Hsu et al. |
| 10,395,356 B2 | 8/2019 | Zhang et al. |
| 2003/0106642 A1 | 6/2003 | Fairbairn et al. |
| 2003/0183940 A1* | 10/2003 | Noguchi ........... H01L 23/53295 257/E21.589 |
| 2003/0210408 A1 | 11/2003 | Jun et al. |
| 2004/0080761 A1 | 4/2004 | Du-Nour et al. |
| 2004/0109173 A1 | 6/2004 | Finarov et al. |
| 2005/0185197 A1* | 8/2005 | Tao .......................... H01L 22/12 356/625 |
| 2006/0187468 A1 | 8/2006 | Bischoff et al. |

OTHER PUBLICATIONS

Office Action dated Aug. 1, 2006, for U.S. Appl. No. 10/859,330, filed Jun. 1, 2004, by McGahan, 8 pgs.
Response to Office Action, dated Nov. 1, 2006, for U.S. Appl. No. 10/859,330, filed Jun. 1, 2004 by McGahan, 10 pgs.
Notice of Allowance dated Dec. 28, 2006, for U.S. Appl. No. 10/859,330, filed Jun. 1, 2004, by McGahan, 4 pgs.
International Search Report and Written Opinion dated Jun. 22, 2009 for PCT Application No. PCT/US2009/042413 filed on Apr. 30, 2009 by Nanometrics Incorporated, 11 pages.
Office Action dated Aug. 30, 2010, for U.S. Appl. No. 12/114,700, filed May 2, 2008, by Liu, 18 pgs.
Germer, Thomas A. "Modeling the effect of line profile variation on optical critical dimension metrology," 2007 Proceeding of SPIE, vol. 6518, 9 pgs.
Response to Office Action, dated Nov. 30, 2010, for U.S. Appl. No. 12/114,700, filed May 2, 2008, by Liu, 15 pgs.
Final Office Action dated Feb. 17, 2011, for U.S. Appl. No. 12/114,700, filed May 2, 2008, by Liu, 13 pgs.
Warren, "Sub-wavelength Diffractive Optics," Sandia Report, SAND98-0508, UC-706, Unlimited Release, Printed Mar. 1998, 31 pgs.
Response to Final Office Action, dated Apr. 7, 20211, for U.S. Appl. No. 12/114,700, filed May 2, 2008, by Liu, 14 pgs.
Notice of Allowance dated Oct. 27, 2011, for U.S. Appl. No. 12/114,700, filed May 2, 2008, by Liu, 13 pgs.

* cited by examiner

EFFECTIVE CELL APPROXIMATION MODEL FOR LOGIC STRUCTURES

FIELD OF THE DISCLOSURE

Embodiments of the subject matter described herein are related generally to optical metrology, and more particularly to modeling and target design for metrology of logic structures.

BACKGROUND

Semiconductor and other similar industries often use optical metrology equipment to provide non-contact evaluation of substrates during processing. With optical metrology, a sample under test is illuminated with light, e.g., at a single wavelength or multiple wavelengths. After interacting with the sample, the resulting light is detected and analyzed to determine a desired characteristic of the sample.

The analysis typically includes a model of the structure under test. The model may be generated based on the materials and the nominal characteristics of the structure, e.g., film thicknesses, line and space widths, etc. One or more parameters of the model may be varied and expected data from the structure may be calculated for each parameter variation based on the model and characteristics of the optical metrology device, e.g., using Rigorous Coupled Wave Analysis (RCWA) or other similar techniques. The measured data may be compared to the predicted data for each parameter variation, e.g., in a linear regression process, until a good fit is achieved between the predicted data and the measured data, at which time the modeled parameters are determined to be an accurate representation of the characteristics of the structure under test.

Modeling techniques are particularly useful when the sample is a simple structure, or uniform patterns. Unfortunately, when the sample is complicated, such as found in random logic structures, analytically modeling the sample can be difficult. For example, the random logic structures include non-periodic elements that cannot be modeled using conventional techniques, such as RCWA. Accordingly, what is needed is an improved optical metrology process that can be used to measure complicated sample structures.

SUMMARY

Standard logic cells are used to design complex circuits, such as cells, complex circuit designs are possible, such as standard logic cells. A standard cell, for example, may represent a basic Boolean function, e.g., NAND, NOR, XOR, or more complex functions, and may contain blocks or patterns that contain 100s or 1000s of individual transistors and interconnect structures. An example, of standard logic cells is random logic, which is a semiconductor circuit design that translates high-level logic descriptions directly into hardware features. The arrangement of features on a chip that includes standard logic cells, such as random logic, is non-periodic and may include few discernible patterns. The lack of patterns in standard logic cells, such as random logic, presents difficulties for optical metrology, due, for example, to the lack of periodic patterns that are typically used for modeling.

To measure a logic cell on a sample that embodies a standard logic cell with non-periodic patterns, the standard logic cell may be approximated using an effective cell approximation. The effective cell approximation is smaller than the standard logic cell and represents the density of lines and spaces of the standard logic cell, but may not be an accurate representation of the patterns in the standard lotic cell. For example, the effective cell approximation may be a small area of the standard logic cell that is selected to represent the density of lines and spaces of the remaining logic cell even though the pattern in the selected area may not be repeated elsewhere in the standard logic cell. In another example, the effective cell approximation may be produced by altering the distribution of lines and spaces in order to uniformly distribute the lines and spaces with the same overall density of lines and spaces in the standard logic cell. Thus, the non-periodic patterns of the standard logic cell are represented in the effective cell approximation with periodic patterns having the same density of lines and spaces as found in the standard logic cell.

The effective cell approximation of the standard logic cell may be embodied in a model that is used to calculate expected measurement data for slight variations in the model, which may be determined in real-time or pre-calculated and stored in a library. The effective cell approximation of the standard logic cell may alternatively be embodied in a plurality of metrology targets, each having slight variations in variable parameters with respect to other metrology targets. The metrology targets may be pre-measured and the resulting data associated with each variation in the variable parameters stored in a library. The effective cell approximation of the standard logic cell may alternatively be embodied in a metrology target that is produced on the sample along with the device under test. A structure on the sample, such as a logic cell under test or a metrology target that is produced based on the effective cell approximation, may be optically measured to acquire measured data using an optical metrology device. The measured data may be compared to data for the effective cell approximation to determine a desired characteristic of the logic cell on the sample.

In one implementation, a method of determining a characteristic of a standard logic cell on a sample may be performed using an optical metrology device. Data for an effective cell approximation for a standard logic cell on a sample is obtained. The effective cell approximation is smaller than the standard logic cell and represents a density of lines and spaces of the standard logic cell. Measured data is acquired from light reflected from a structure on the sample. The characteristic of the standard logic cell on the sample is determined using the measured data and the data for the effective cell approximation.

In one implementation, an optical metrology device is configured to determine a characteristic of a standard logic cell on a sample. The optical metrology device includes a light source that produces light that is incident on and reflected by a sample and includes at least one detector that receives the light after it is reflected by the sample. The optical metrology device includes at least one processor coupled to the at least one detector. The at least one processor is configured to obtain data for an effective cell approximation for a standard logic cell on a sample is obtained. The effective cell approximation is smaller than the standard logic cell and represents a density of lines and spaces of the standard logic cell. The at least one processor is further configured to acquire measured data from light reflected from a structure on the sample and to determine the characteristic of the standard logic cell on the sample using the measured data and the data for the effective cell approximation.

In one implementation, an optical metrology device is configured to determine a characteristic of a standard logic cell on a sample. The optical metrology device includes a light source that produces light that is incident on and reflected by a sample and includes at least one detector that receives the light after it is reflected by the sample. The optical metrology device includes a means for obtaining data for an effective cell approximation for a standard logic cell on a sample. The effective cell approximation is smaller than the standard logic cell and represents a density of lines and spaces of the standard logic cell. The optical metrology device further includes a means for acquiring measured data from light reflected from a structure on the sample and a means for determining the characteristic of the standard logic cell on the sample using the measured data and the data for the effective cell approximation.

DETAILED DESCRIPTION

During fabrication of semiconductor and similar devices it is sometimes necessary to monitor the fabrication process by non-destructively measuring the devices. Optical metrology may be employed for non-contact evaluation of samples during processing. In one conventional metrology technique, structural parameters of standard cells in semiconductor design may be monitored by optically measuring a structure that represents the sample, e.g., a portion of the sample or a target that mimics the sample. The measured structure, for example, may be in in-die on the wafer or in-scribe, i.e., between the dies on the wafer. The structure may be modeled mathematically using a technique, such as Rigorous Coupled Wave Analysis (RCWA), Finite Difference Time-Domain (FDTD), or Finite Element Method (FEM), may be used to generate predicted data for the structure. The predicted data is compared to the measured data from the structure. One or more parameters of the model of the structure may be repeatedly adjusted and the predicted data compared to the measured data using a linear regression process until the fit is considered to be within tolerance indicating the parameter accurately represents a characteristic of the standard cell.

In semiconductor design standard cells may be used for designing application-specific integrated circuits (ASICs) using, e.g., primarily digital-logic features. The use of standard cells permits low-level very-large-scale integration (VLSI) layout to be encapsulated into an abstract logic representation. A standard cell, by way of example, may be a group of transistors along with interconnect structures that provide that provide logic functions, such as AND, OR, XOR, XNOR, inverters, or a storage function, such as flipflop or latch. While a simple standard cell may represent a basic Boolean function, e.g., NAND, NOR, XOR, more complex standard cells may represent more complex functions, and may contain blocks or patterns that contain 100s or 1000s of individual transistors and interconnect structures. With the use of a large number of standard cells, complex circuit designs are possible, such as standard logic cells. An example, of standard logic cells is random logic, which is a semiconductor circuit design that translates high-level logic descriptions directly into hardware features such as AND and OR gates. Typically, the arrangement of features on a chip that includes standard logic cells, such as random logic, is non-periodic and may include few discernible patterns. The lack of patterns in standard logic cells, such as random logic, presents difficulties in modeling for optical metrology.

For example, modeling using techniques such as Rigorous Coupled Wave Analysis (RCWA) require that the modeled structure is periodic. The use of RCWA in a modeling engine is desirable because it is a relatively fast modeling technique that converges quickly, but all structures are assumed to be repeating, i.e., periodic. Some standard cells, however, include logic structures that include non-periodic elements, random logic cells. Accordingly, modeling techniques that require periodicity, such as RCWA, are conventionally unsuitable for aperiodic standard cells.

Other modeling techniques that do not require periodicity, such as Finite Difference Time-Domain (FDTD) or Finite Element Method (FEM), may be used with aperiodic standard cells, but these techniques require rigorous modeling of the entire standard cell, as well as nanometer-level positioning during measurement to ensure that the measured area matches the modeled area. Moreover, the illumination spot size must be carefully measured as well to ensure that the measured area matches the modeled area. Alternatively, the entire cell may be imaged in multiple pixels, e.g., using an imaging ellipsometer, which reduces throughput. "Model-less" metrology techniques may additionally be used with aperiodic standard cells. Model-less metrology techniques, for example, rely on spectral dimension reduction and are used with machine learning to train the recipe to recognize features in the spectra that correspond to a feature of interest. Model-less techniques do not require rigorous modeling but require reference information to generate the recipe (in addition to verifying the recipe) and may not capture low-sensitivity parameters and are generally not as robust to process variation as modeling techniques.

As discussed herein, optical metrology of a non-periodic standard logic cell, such as a random logic cell, may be performed by approximating the standard logic cell with an "effective cell," which models structures within the standard logic cell but approximates the non-periodic patterns in the standard logic cell based on the layout density, i.e., the density of lines and spaces. The layout density may be determined, for example, from the actual Geometric Data Stream (GDS) layout for the standard logic cell. Patterns within the effective cell approximation may be distributed within the unit cell equally with the same layout density as the standard logic cell under test. The pattern distribution in the effective cell approximation may not precisely match the pattern in the standard logic cell, for example, the aperiodic patterns in the standard logic cell under test may be represented in the effective cell approximation by periodic patterns that have the same density of lines and spaces. Accordingly, modeling techniques that require periodicity, such as RCWA, may be used with the effective cell approximation, if desired. Moreover, there is no requirement for modeling the entire standard cell. The effective cell approximation, for example, may be much smaller than the standard logic cell under test, e.g., it may be only 10%-20% of the standard logic cell size. Because the effective cell approximates the density of lines and spaces in the standard logic cell, there is no requirement to precisely control positioning during measurement to ensure that the measured area matches the modeled area.

In some implementations, a model may be generated for the effective cell approximation that represents the standard logic cell, and which is smaller than the standard logic cell and represents the density of lines and spaces of the standard logic cell. During testing, measured data from the light that is reflected from a structure on the sample under test may be compared to the modeled effective cell to determine a desired characteristic of the standard logic cell. The structure, for example, may be at least a portion of the logic cell under test, which embodies the standard logic cell, or the structure may be a metrology target that is designed based on the effective cell approximation for the standard logic cell. Predicted data from the model, for example, may be compared to the measured data as one or more variable parameters of the model of the effective cell approximation are varied, e.g., using a linear regression process, until the fit is considered to be within tolerance, indicating the parameter(s) accurately represent the measured characteristic(s) of the standard logic cell.

In one implementation, a metrology target for a logic structure that embodies the standard logic cell may be designed based on an effective cell approximation for the standard logic cell. The metrology target may be produced on the sample along with a logic structure under test, e.g., at an in-die or in-scribe location. The metrology target may be measured using modeling techniques, e.g., by modeling the effective cell approximation for the standard logic cell, as discussed above. Alternatively, the metrology target may be measured without modeling, e.g., based on pre-calibrated measurement responses for changes in one or more variable parameters.

Figure 1:
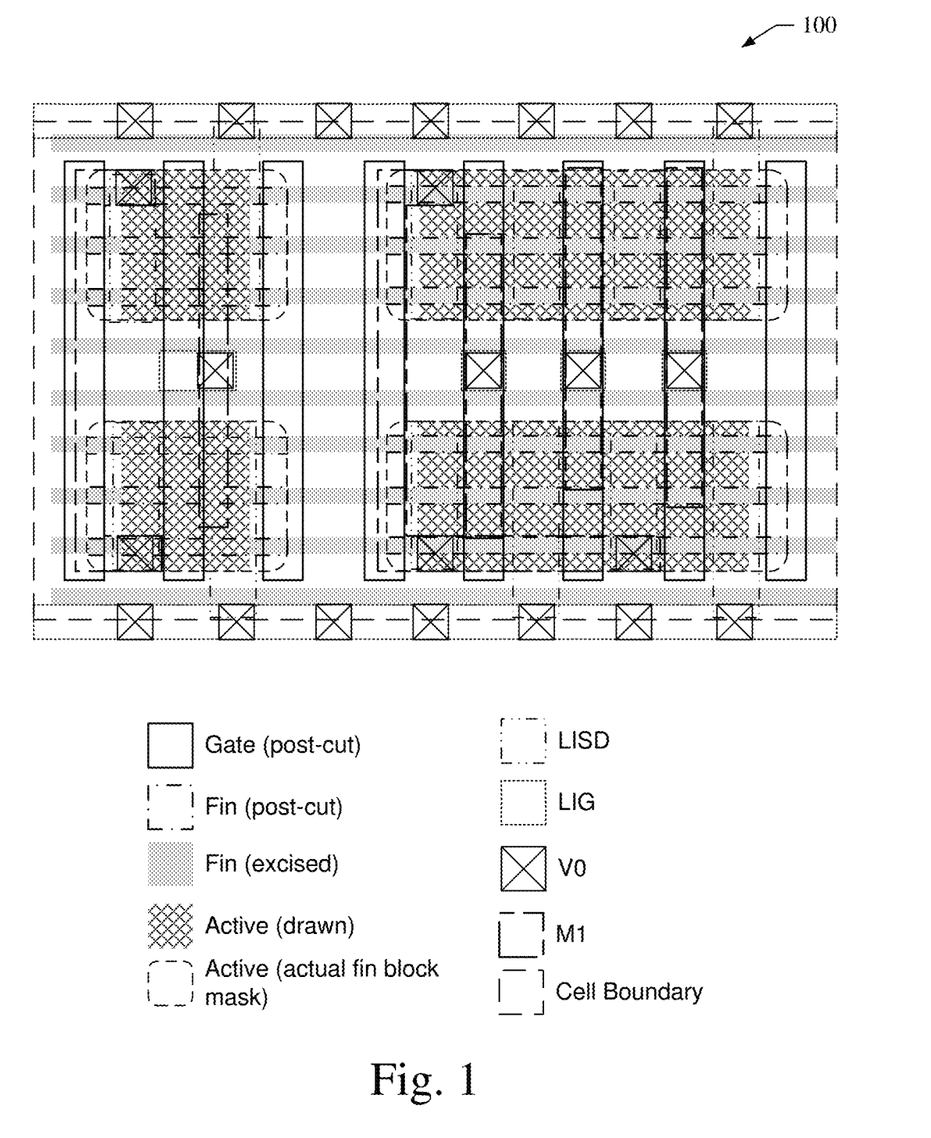
FIG. 1 illustrates an example of a portion of a standard cell that shows a top plan view.

FIG. 1 illustrates an example of a portion of a standard cell 100 that shows a top plan view. Standard cells, such as standard cell 100, may be generally produced using multi-track layout, e.g., using multiple patterning, such as self-aligned double patterning (SADP) and self-aligned quadruple patterning (SAQP) techniques to print shapes in advanced logic nodes, e.g., using shallow trench isolation (STI) to generate non-planar transistors. Such techniques use uni-directional layouts of repeating lines. The standard cell is generally characterized as gates extending in one direction (shown vertically in the top diagram of the standard cell in FIG. 1) and fins extending orthogonally to the gates (shown horizontally in the top diagram of the standard cell in FIG. 1). In order to produce standard logic cells, a large number of standard cells are produced in the X and Y (vertical and horizontal) directions, and "cut masks" are used to etch unique patterns in the repeating lines, e.g., in the gates and fins, local-interconnect gates (LIG) and local-interconnect source-drain (LISD) in specific layers.

As discussed above, the standard cell 100 may be part of a complex circuit design, which may use a large number of standard cells, e.g. to produce standard logic cells. An example, of standard logic cells is "random" logic, which is a semiconductor circuit design that translates high-level logic descriptions directly into hardware features, such as AND OR or other logic gates. The generation and use of random logic in semiconductor circuit design and production are well known to those of ordinary skill in the art. Random logic results from perturbations in the design pattern over a short range (e.g., lateral dimensions on the order of a single transistor), that results in a large population of different local patterns in the long range (e.g., lateral dimensions on the order of a multiples or 10s or 100s of transistors). The perturbations may be produced using "cuts" in the pattern.

For example, in the short range (e.g., lateral dimensions on the order of a single transistor), "random" logic is the sum of many binary steps throughout the process. These steps are inherently binary in advanced logic for two main reasons. First, fin field-effect transistor (FinFET) and Gate-All-Around (GAA) devices have "quantized" channels because the height and width of the channel region of a fin or GAA structure in a single Logic block are all nominally the same. To increase drive current for P-channel metal-oxide-semiconductor (PMOS) relative to N-type metal-oxide semiconductor (NMOS), fins are added in discrete numbers and at set ratios (such as 2:3 in many cases). The second reason is that dimensional scaling has necessitated the move to multiple patterning schemes (even in Extreme Ultraviolet (EUV) lithography), which means that patterns are essentially one-dimensional (1D). The only way to change the 1D patterns is to "cut" them. The "cuts" in the pattern are what make the logic blocks "random".

By way of example, in the front-end-of-line (FEOL) and middle-end-of-line (MEOL), there are several "binary" steps where the "cuts" may either exist or not exist to produce random logic. At the Fin level, a fin cut may be used to define whether a transistor is "active" or a "dummy," e.g., where for an "active" transistor, the gate to fin intersection must include fin on both sides of the gate. At the Gate level, a diffusion break may be produced as a deep etch parallel to the gate in a "dummy" gate area, which may be defined at a "Fin Cut", and is used to electrically isolate neighboring devices. At the Gate level, a gate cut may be used at the interface of the N and P device. With an uncut gate, for example, that the N and P gates are electrically coupled together, whereas, with a cut gate the N and P gates are electrically isolated. The gate may be cut at different process steps in the gate level (e.g., Pre-poly-Si gate formation, post poly-Si gate formation, or post replace poly-Si gate). At the MEOL level, the Source Drain contact may be cut, e.g., after the FEOL is completed, so that the Source and/or Drain of the transistor may be either be contacted or not contacted. At the MEOL level, the gate contact may be cut after the FEOL is completed, e.g., where active gates are always contacted but the contact location may differ depending on whether the gate has been cut and other routing concerns.

Logic scaling has progressed into the sub-20 nm nodes using multiple patterning, e.g., SADP and SAQP, for more and more lithography steps, which requires uni-directional layouts. These restrictions lead to inherently periodic patterning everywhere in-die (including the standard cell), except patterning produced with cut masks, e.g., resulting in random logic.

Figure 2:
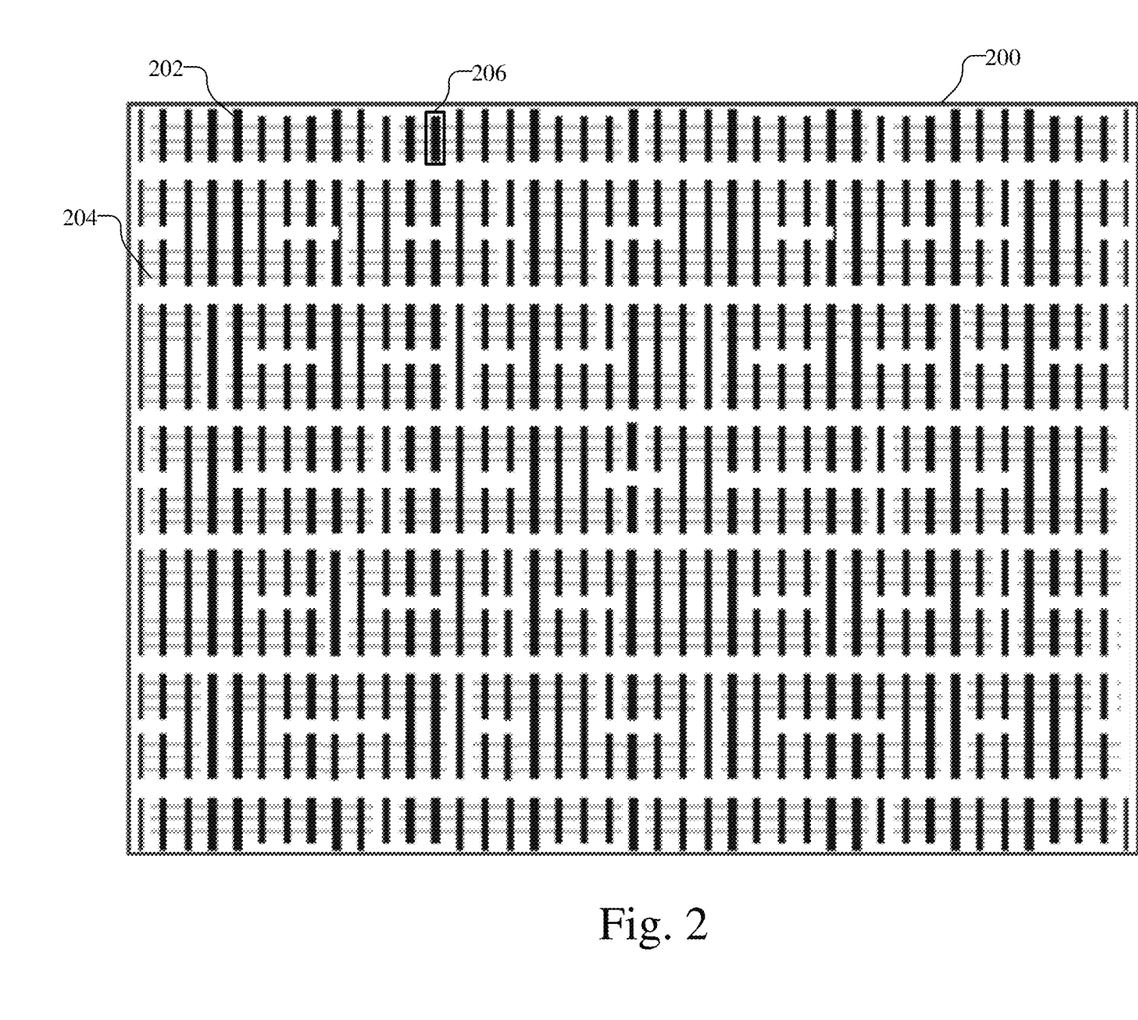
FIG. 2 is a plan view of an example layout of a standard logic cell produced using a plurality of standard cells, such as that shown in FIG. 1, and including non-periodic patterns of lines and spaces.

FIG. 2 is a plan view of a layout of a standard logic cell 200, which may be produced using a plurality of standard cells, such as that shown in FIG. 1 (or other standard cells) that extend in the X and Y directions. The layout of the standard logic cell 200 includes vertical bars 202, representing gate patterns and horizontal bars 204 representing fin patterns. A single standard cell, identified in FIG. 2 by a box 206, is replicated repeatedly throughout the standard logic cell 200 with gaps or spaces between the gates and fins produced, e.g., using cut masks, resulting in non-periodic patterns, and thus the standard logic cell 200 may be referred to as a random logic cell. For example, the standard logic cell 200 may be produced using 7 nm Design rules, with 28 nm fin pitch and 56 nm gate pitch. The pitch, for example, in the X direction is 2240 nm with 40 gates and the Y direction is 1680 nm cut 2 (spacing between the N and P transistors), leave 3 (fins on all transistors). Of course, a standard logic cell may be produced using other Design rules.

For optical metrology of a logic structure that embodies the standard logic cell, an effective cell approximation of the standard logic cell 200 may be generated. The effective cell approximation accurately represents structures, e.g., the standard cells, within the standard logic cell 200, but does not accurately represent the non-periodic patterns in the standard logic cell 200. Instead, an effective cell approximation represents the non-periodic pattern using a pattern that has the same density in lines and spaces as found in the overall standard logic cell. Thus, the pattern of lines and spaces in the effective cell approximation may be different than patterns of lines and spaces found in the standard logic cell, but the density of lines and spaces is the same. For example, in one implementation, the effective cell approximation may be produced by selecting a representative area of the standard logic cell 200, sometimes referred to herein as a tile, and accurately representing the tile. In another implementation, the effective cell approximation may be produced by approximating the density distribution of the standard logic cell 200, but not accurately representing the pattern at any particular area of the standard logic cell.

Figure 3:
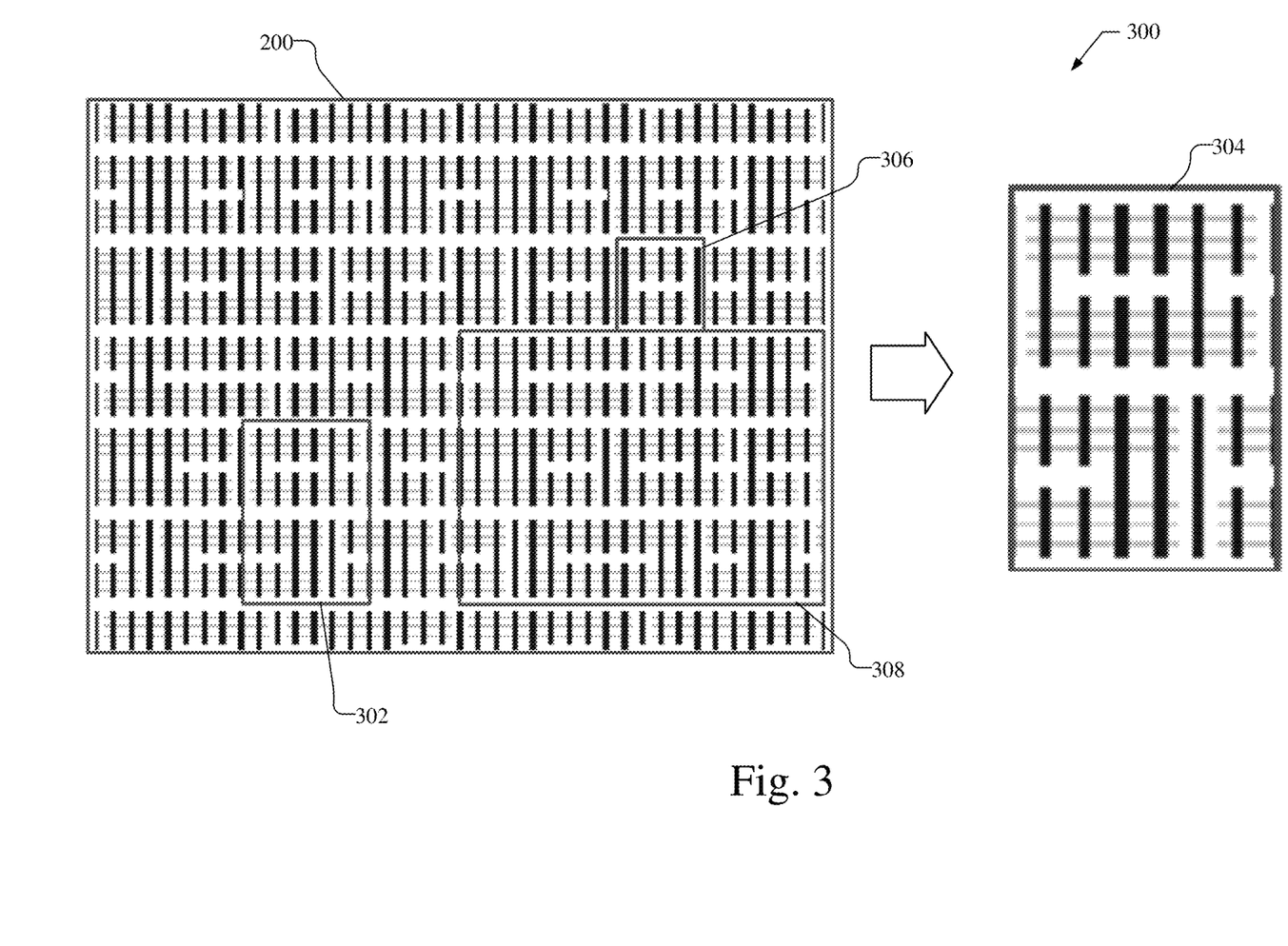
FIG. 3 illustrates a process of generating an effective cell approximation of the standard logic cell from FIG. 2 based on a representative area of the standard logic cell.

FIG. 3, for example, illustrates a process 300 of generating an effective cell approximation 304 of the standard logic cell 200, e.g., a random logic cell, based on a representative area or tile 302 of the standard logic cell 200. As illustrated, an area 302 of the standard logic cell 200 may be selected as representative of the remaining standard logic cell. The representative tile 302, for example, is selected based on the overall layout of the standard logic cell 200 so that the density distribution of lines and spaces within the tile 302 is the same or closely approximates the density distribution of lines and spaces of the overall standard logic cell 200. Thus, an effective cell approximation 304 may be produced for the full standard logic cell 200 using the representative tile 302. As can be seen, structures within the representative tile 302 (and thus the effective cell approximation 304) includes non-periodic patterns. Accordingly, the representative tile 302 may be rigorously modeled using modeling techniques that do not require periodicity, such as FDTD or FEM.

If desired, other sizes of the representative tile used for the effective cell approximation of the standard logic cell 200 may be used. For example, as illustrated by tile 306, an area of the standard logic cell 200 that includes only a few gates and STI structures may be used, e.g., a unit pitch that is approximately 10× larger than the design rule for gate and fin pitch may be used to provide a 10% resolution on density approximation. On the other hand, as illustrated by tile 308, a relatively large number of gates and STI structures may be included in the representative area for the standard logic cell 200. The size of the tile used, for example, may be selected based on a tradeoff off between the accuracy of the approximation of the standard logic cell 200 and the computation time. For example, the smallest tile 306 will have a significantly faster computation time than the largest tile 308, but the smallest tile 306 may not be as accurate of an approximation of the standard logic cell 200 as the largest tile 308, and thus may require measurement from areas of the logic cell under test with the same or very similar patterns found in the smallest tile 306. If the probe size of the metrology device is small, e.g., 5×5 μm, it may be desirable to align the spatial alignment of the size of the tile and the probe size.

Figure 4:
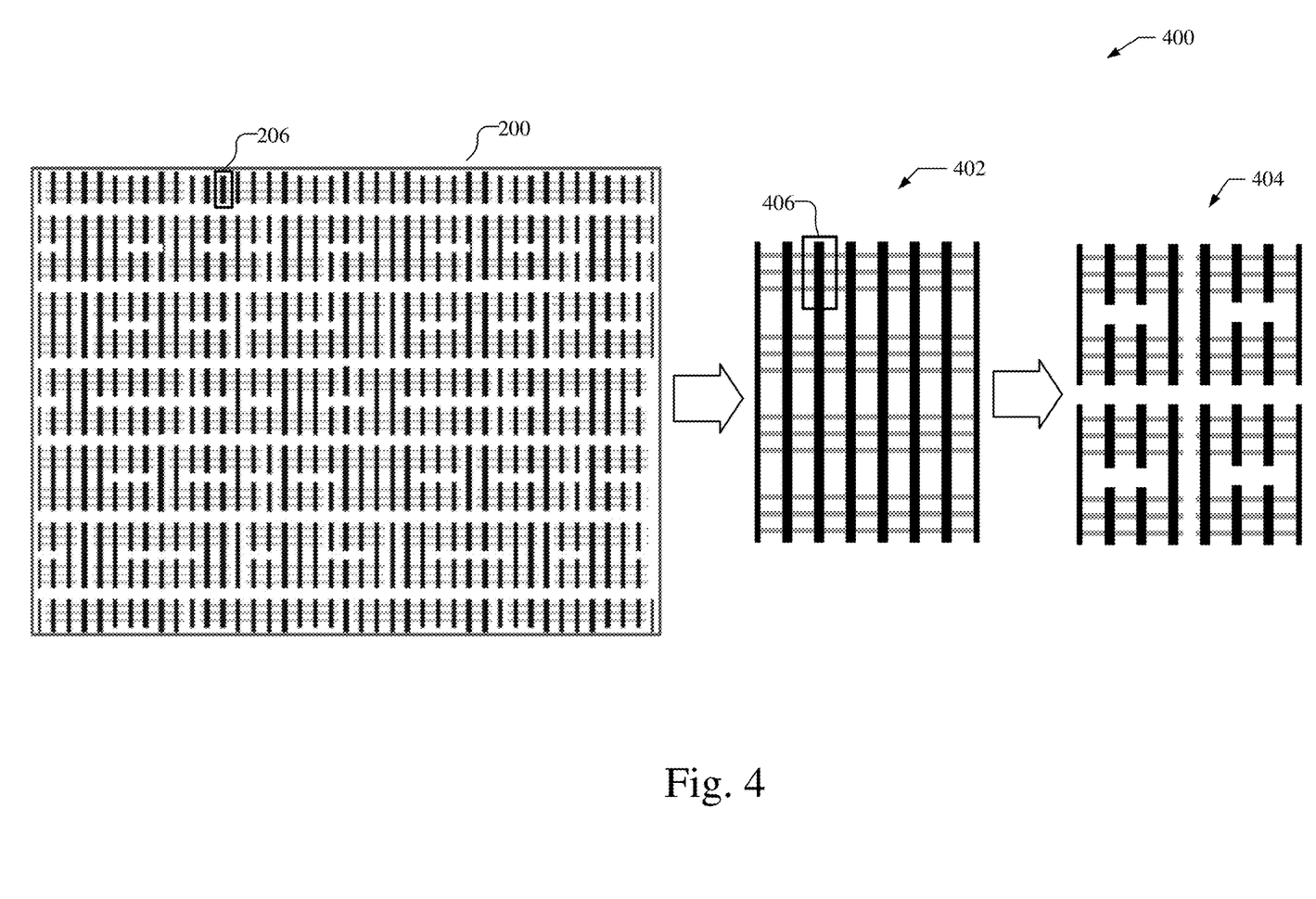
FIG. 4 illustrates a process of generating an effective cell approximation of the standard logic cell from FIG. 2 based on a known density of structures, e.g., lines and spaces, in the standard logic cell.

FIG. 4, for example, illustrates a process 400 of generating an effective cell approximation 404 of the standard logic cell 200, e.g., a random logic cell, based on a known density of structures, e.g., lines and spaces, in the standard logic cell 200. Patterns within the effective cell approximation 404 for the standard logic cell 200 may be distributed within the unit cell equally with the same (or approximately the same) layout density as the standard logic cell 200. Thus, the effective cell approximation 404 represents non-periodic patterns in the standard logic cell using periodic patterns that have the same density of lines and spaces as found in the standard logic cell. For example, as illustrated in FIG. 4, the pattern distribution in the effective cell approximation 404 may not precisely match the actual pattern at any location within the standard logic cell 200, but the density of the structures, e.g., the gates and STI, in the effective cell approximation 404 may be approximately the same as that of the overall standard logic cell 200.

As illustrated in FIG. 4, the effective cell approximation 404 of the standard logic cell 200 may be generated by rigorously modeling the standard cell illustrated by box 406, e.g., using RCWA, FDTD, FEM, etc. The pitch of the standard cell may be extended in the X and Y direction by a number of periods, e.g., by 4-5 times, or any other desired factor, to produce a unit cell 402. The layout density in the aperiodic layers (e.g., layers that are patterned by cut masks) of the standard logic cell 200 may be determined and then distributed uniformly in the unit cell 402 to produce the effective cell approximation 404. The layout density of the standard logic cell 200 may be found in the actual or a representative Geometric Data Stream (GDS) layout. For example, the density of cuts in the gates may be determined to be 40% and the density of cuts in the STI may be determined to be 25%. The same or approximately the same density of cuts to the gates and STI may be uniformly distributed in the unit 402. The size of the unit cell 402, i.e., the number of standard cells within the unit cell 402, may be selected such that the desired density of cuts in the gates and STI may be achieved. For example, the lease common multiple for the density of the cuts in the gates and STI may be used to determine the number of pitches within the unit cell 402. Alternatively, the size of the unit cell 402 may be selected such that a close approximation of the desired density of cuts in the gates and STI may be achieved, but accuracy of the measurement of the logic cell under test may suffer. While the distribution pattern in the effective cell approximation 404 does not precisely match any particular location within the standard logic cell 200, the density of lines and spaces, in the effective cell approximation 404 matches the standard logic cell 200.

By uniformly distributing patterns within the effective cell approximation 404, with the same or approximately the same distribution density as found in the standard logic cell 200, the resulting effective cell approximation 404 may be periodic. Accordingly, the effective cell approximation 404 may be modeled using techniques that require periodicity, such as RCWA. Of course, other modeling techniques, such as FDTD or FEM may be used if desired.

In one implementation, during testing, measured data from the light that is reflected from a logic structure under test that embodies the standard logic cell 200 may be compared to the model data produced using the effective cell approximation 404 to determine a desired characteristic of the logic structure under test. In another implementation, the effective cell approximation may be physically produced as a metrology target on the sample along with the logic structure under test, e.g., at an in-die location or in-scribe location. The metrology target, for example, may be designed based on the selected area of the standard logic cell, e.g., tile 302 shown in FIG. 3, that serves as an effective cell approximation for the standard logic cell. In another implementation, the metrology target may be designed based on the effective cell approximation that is produced based on design rules and having the same pattern density as the standard logic cell, e.g., effective cell approximation 404 show in FIG. 4.

Figure 5:
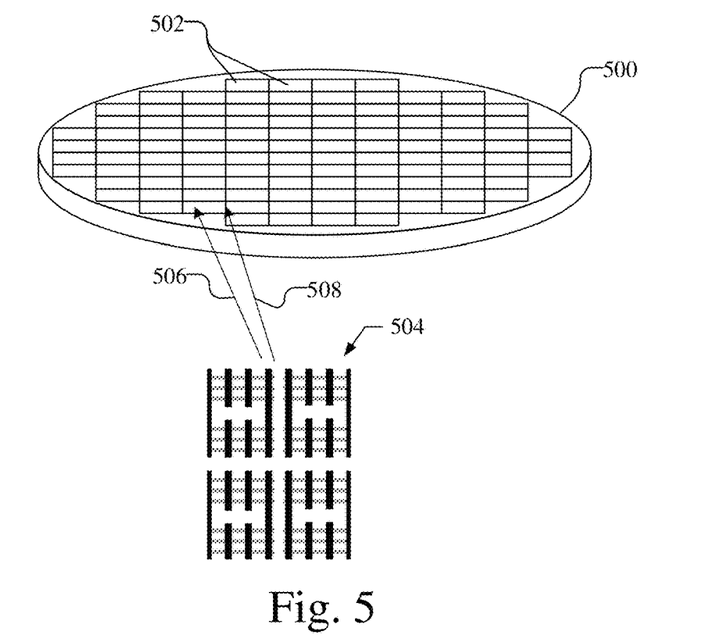
FIG. 5 illustrates a perspective view of a wafer including a plurality of dies and that includes a metrology target that is designed based on an effective cell approximation of the standard logic cell in an in-die location or in-scribe location.

FIG. 5, by way of example, illustrates a perspective view of a wafer 500 including a plurality of dies 502, which may include one or more logic structures embodying a standard logic cell, e.g., a random logic cell. The wafer 500 further includes a metrology target 504 that is designed based on the effective cell approximation of the standard logic cell 200, e.g., such as illustrated in FIG. 3 or 4. The effective cell approximation metrology target 504 may be located at an in-die location, e.g., as illustrated by arrow 506 or in an in-scribe location between dies, as illustrated by arrow 508.

In some implementations, the effective cell approximation metrology target 504 may be modeled, e.g., using any desired modeling technique. During testing, measured data from the light that is reflected from the metrology target 504 on the sample may be compared to the modeled data produced using the effective cell approximation to determine a desired characteristic of the logic structure. Alternatively, the effective cell approximation metrology target 504 may be measured without modeling, e.g., based on pre-calibrated measurement responses for changes in one or more variable parameters. For example, a plurality of effective cell approximation metrology targets, each having slight variations in variable parameters with respect to other effective cell approximation metrology targets, may be generated and measured and stored in a library. The measured data from an effective cell approximation metrology target may be compared to measurement results stored in the library to find a best fit, e.g., based on the Mean-Squared Error (MSE), from which the characteristic(s) of the logic structure may be determined as the value(s) of the variable parameter(s) in the pre-measured metrology target corresponding to the best fit measurement result.

The logic structure on the sample that embodies the standard logic cell, e.g., a random logic cell, modeled using an effective cell approximation or the effective cell approximation metrology target may be measured using an optical metrology device, such as a reflectometric, ellipsometer, Mueller Matrix ellipsometer, FTIR, etc.

Figure 6:
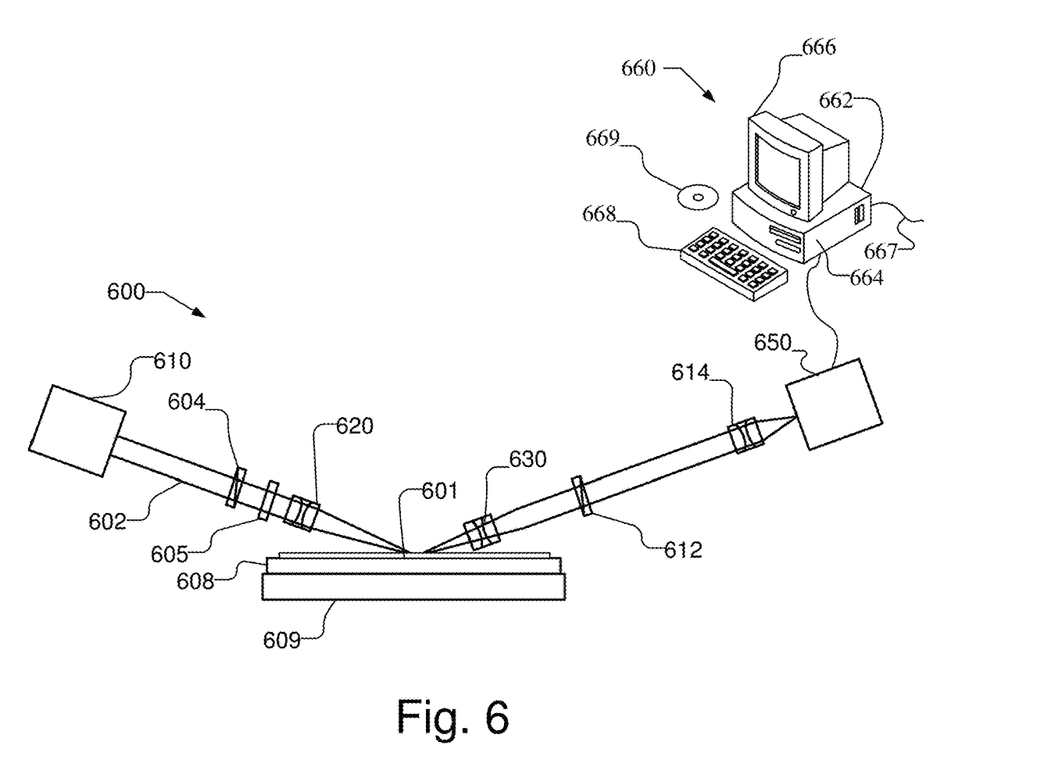
FIG. 6 illustrates an example of optical metrology device that may be used to collect and analyze data using an effective cell approximation.

FIG. 6, by way of example, illustrates a schematic view of an optical metrology device 600 that may be used to collect and analyze data using an effective cell approximation, as described herein, to measure a characteristic of a standard logic cell, e.g., a random logic cell, embodiment in a logic structure under test. The optical metrology device 600 may be configured to perform, e.g., spectroscopic reflectometry, ellipsometry measurements, including Mueller Matrix ellipsometry measurements, or FTIR measurements, of a sample 601 that includes a logic structure that embodies the standard logic cell. It should be understood that optical metrology device 600 is illustrated as one example of a metrology device that may be use the effective cell approximation, as discussed herein, and that if desired other metrology devices may be used, including normal incidence devices, non-polarizing device, etc.

Optical metrology device 600 includes a light source 610 that produces light 602. The light 602, for example, UV-visible light with wavelengths, e.g., between 200 nm and 800 nm. The light 602 produced by light source 610 may include a range of wavelengths, i.e., broadband, or may be monochromatic. The optical metrology device 600 includes focusing optics 620 and 630 that focus and receive the light and direct the light to be obliquely incident on a top surface of the sample 601. The optics 620, 630 may be refractive, reflective, or a combination thereof and may be an objective lens.

The reflected light may be focused by lens 614 and received by a detector 650. The detector 650, may be a conventional charge coupled device (CCD), photodiode array, CMOS, or similar type of detector. spectrometer that disperses the full spectrum of the polarized light into spectral components across an array of detector pixels. The detector 650 may be, e.g., a spectrometer, e.g., if broadband light is used, e.g., where detector 650 generates a spectral signal as a function of wavelength λ. One or more polarizing elements may be in the beam path of the optical metrology device 600. For example, optical metrology device 600 may include one or both (or none) of a polarizing element 604 in the beam path before the sample 601, and a polarizing element (analyzer) 612 in the beam path after the sample 601, and may include one or more additional elements, such as a compensator of photoelastic modulator 605.

The detector 650 may be coupled to at least one processor 660, such as a workstation, a personal computer, central processing unit or other adequate computer system, or multiple systems. It should be understood that one processor, multiple separate processors or multiple linked processors may be used, all of which may interchangeably be referred to herein as processor 660, at least one processor 660, one or more processors 660. The processor 660 is preferably included in or is connected to or otherwise associated with optical metrology device 600. The processor 660, for example, may control the positioning of the sample 601, e.g., by controlling movement of a stage 609 that is coupled to the chuck. The stage 609, for example, may be capable of horizontal motion in either Cartesian (i.e., X and Y) coordinates, or Polar (i.e., R and θ) coordinates or some combination of the two. The stage may also be capable of vertical motion along the Z coordinate. The processor 660 may further control the operation of the chuck 608 to hold or release the sample 601. The processor 660 may also collect and analyze the data obtained from the detector 650. The processor 660 may analyze the data to determine one or more physical characteristics of a logic structure under test on the sample 601 using an effective cell approximation, as discussed herein. For example, the processor 660 may compare data measured from the logic cell that embodies a standard logic cell or from an effective cell approximation metrology target to predicted data that is based on one or more models for the effective cell approximation. Parameters of the model are varied and predicted data compared to the measured data, e.g., in a linear regression process, until a good fit is achieved between the predicted data and the measured data, at which time the modeled parameters are determined to be the characteristic of the logic structure under test.

The processor 660, which includes at least one processing unit 662 with memory 664, as well as a user interface including e.g., a display 666 and input devices 668. A non-transitory computer-usable storage medium 669 having computer-readable program code embodied may be used by the processor 660 for causing the at least one processor to control the optical metrology device 600 and to perform the functions including the analysis described herein. The data structures and software code for automatically implementing one or more acts described in this detailed description can be implemented by one of ordinary skill in the art in light of the present disclosure and stored, e.g., on a computer-usable storage medium 669, which may be any device or medium that can store code and/or data for use by a computer system such as processing unit 662. The computer-usable storage medium 669 may be, but is not limited to, flash drive, magnetic and optical storage devices such as disk drives, magnetic tape, compact discs, and DVDs (digital versatile discs or digital video discs). A communication port 667 may also be used to receive instructions that are used to program the processor 660 to perform any one or more of the functions described herein and may represent any type of communication connection, such as to the internet or any other computer network. The communication port 667 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. The results from the analysis of the data may be stored, e.g., in memory 664 associated with the sample 601 and/or provided to a user, e.g., via display 666, an alarm or other output device. Moreover, the results from the analysis may be fed back to the process equipment to adjust the appropriate patterning step to compensate for any detected variances in the multiple patterning process.

Figure 7:
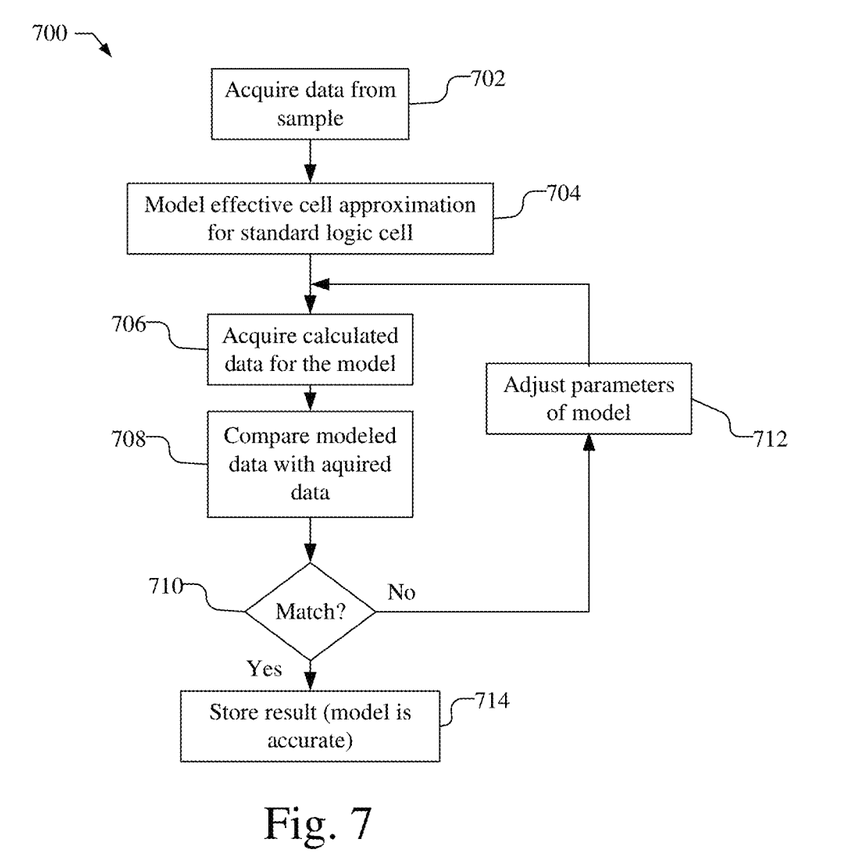
FIG. 7 is a flow chart illustrating a method of measuring a sample using an effective cell approximation.

FIG. 7 is a flow chart 700 illustrating a method of measuring a sample using modeling of an effective cell approximation, as discussed herein. At block 702, data from the sample is acquired using an optical metrology device, such as optical metrology device 600 shown in FIG. 6. The data may be acquired from a portion of a logic structure that embodies a standard logic cell, e.g., a random logic cell, under test on the sample. Alternatively, the data may be acquired from a metrology target that is designed based on an effective cell approximation for the standard logic cell, e.g., a random logic cell, under test, e.g., as discussed in FIG. 5. The acquired data may be, e.g., spectral information, ellipsometric information, scattering information, FTIR information, etc., but for the sake of simplicity, the present disclosure will refer to acquiring and using spectral information. Thus, by way of example, the metrology device 600 produces light that is incident on the sample, i.e., the standard logic cell under test or the effective cell approximation metrology target for the standard logic cell under test. The light that is scattered and/or reflected from the sample is detected and data is acquired from the detected light. The acquired data is indicative of the characteristics of the sample of structures in the standard logic cell on the sample, such as the critical dimension, line widths, line heights, sidewall angles.

At block 704, an effective cell approximation for the standard logic cell is modeled. For example, in one implementation, the effective cell approximation for the standard logic cell may be a representative tile within the standard logic cell, and the representative tile may be rigorously modeled, e.g., as discussed in FIG. 3. In another implementation, the effective cell approximation for the standard logic cell may be generated based on the pattern density in the standard logic cell to produce a uniformly patterned effective cell approximation, and the effective cell approximation may be rigorously modeled, e.g., as discussed in FIG. 4. It should be understood that the pattern in the effective cell approximation may not accurately represent the pattern at any location of the standard logic cell, but has the same, or nearly the same, pattern density as the standard logic cell. The model may be generated on the fly or multiple models with different parameters may be pre-generated and stored in a library.

At block 706, once the initial model is formed, data of the model's response to incident light (having the same parameters as the light used in the optical metrology device) is acquired. In other words, data, such as the spectra from the model, is calculated, which may be done in real time or pre-generated and stored in the library and acquired by the processor 660 from the library, e.g., stored in the memory 664.

At block 708, the modeled data is compared to the acquired data. By way of example, the Mean-Squared Error (MSE) may be used to compare the acquired and modeled data. At block 710, if the modeled data is considered to match the measured data, the parameters of the model of the effective cell approximation may be assumed to accurately represent the corresponding parameters of the standard logic cell, and the result is stored, e.g., in a computer memory or storage, and/or displayed to the user at block 714.

If, however, at block 710, the modeled data and the acquired data do not match, then at block 712, the values of one or more variable parameters in the model of the effective cell approximation are adjusted and the process returns to block 706. Thus, in a real-time analysis, the variable parameters may be adjusted using the Levenberg-Marquardt algorithm, and the data is recalculated using the new model at block 706. By way of example, one or more of the line widths, line heights, sidewall angles, or other variable parameters of the model are adjusted. With the use of a library, the parameters of the model are adjusted by selecting a model in the library with a different value of the variable parameters from the previous model and the data for the new model is acquired at block 706. The modeled data from the new model is then again compared to the acquired data at block 708 and if the acquired and modeled data still do not match, the values of the variable parameters of the model are again adjusted at block 712.

In this manner, the parameters of the model are iteratively adjusted until the modeled data for the model of the effective cell approximation and the acquired data from the sample closely match. A match between the data can be determined when further adjustment of the optical model does not improve the fit or when the fit, which may be determined from the MSE, is below a preselected threshold. When the modeled data and measured data are considered to match, the parameters of the model of the effective cell approximation may be assumed to accurately represent the corresponding parameters of the standard logic cell at block 714. The results may then be stored in a memory 664 or storage medium 669 or reported to a user interface device, such as a display 666 or provided via communication port 667 in a feed forward or feedback process in order to adjust a process parameter associated with a fabrication process step of the samples to compensate for any detected variances.

Measurements performed at a plurality of locations of a sample can be compared to obtain relative measurements for the different locations. The ability to resolve differences in a sample is important to control the many processes, such as chemical mechanical polishing.

There is a possibility that more than one set of parameters for the model will produce calculated data that matches the acquired data. Thus, a verification procedure may be used to ensure that the measurements made using an effective cell approximation are correct. For example, the measurement may be verified by measuring a plurality of locations on the substrate and using the relation between the measurements as verification of the accuracy of the measurements.

In another implementation, the logic structure that embodies a standard logic cell, e.g., a random logic cell, may be measured using an effective cell approximation for the standard logic cell without modeling. For example, a metrology target for the logic structure may be designed based on the effective cell approximation of the standard logic cell. Measured data may be acquired from the metrology target using an optical metrology device, such as optical metrology device 600 shown in FIG. 6. The response of the metrology target may be pre-calibrated, e.g., by measuring and storing the measured data from a plurality of metrology targets that are designed based on the effective cell approximation, but that have slight variations in one or more variable parameters. During testing, the measured data from the metrology target is compared to the pre-calibrated measurements results to determine a best fit, from which the characteristic(s) of the logic structure may be determined as the value(s) of the variable parameter(s) in the pre-measured metrology target associated with the best fitting measurement result.

Figure 8A:
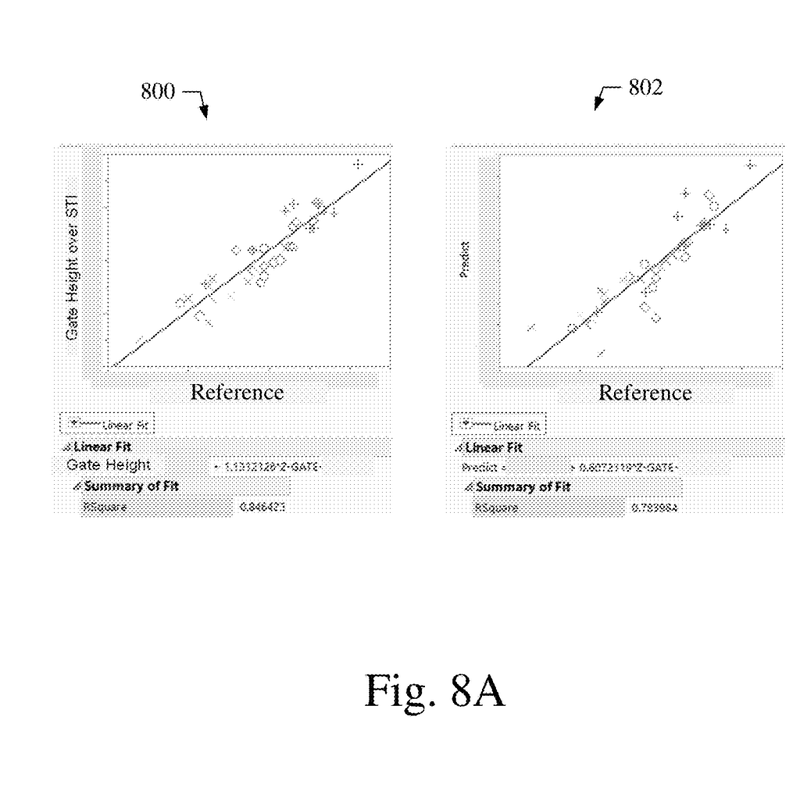
FIGS. 8A and 8B illustrate measurement results produced using an effective cell approximation versus other measurement techniques.
Figure 8B:
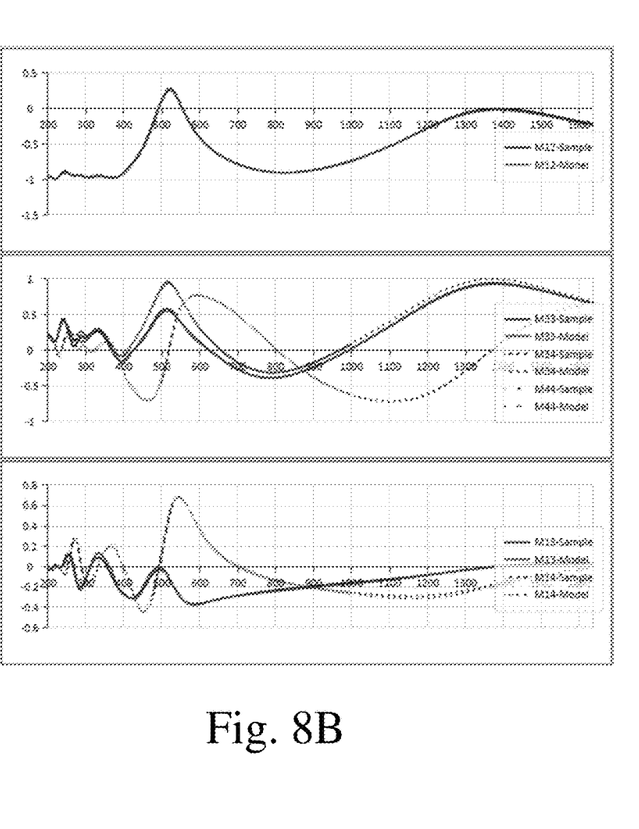

FIG. 8A show graphs 800 and 802 showing key parameter correlation results using effective cell approximation (800) and using machine learning techniques (802). FIG. 8A illustrates the gate height over STI along the Y axis of graph 800 measured (e.g., simulated) using effective cell approximation, and the gate height STI along the Y axis of graph 802 predicted by the machine learning model. FIG. 8B illustrates the fit for Mueller Matrix spectral data that is acquired (Mxy-Sample) and the spectral data that is modeled using effective cell approximation (Mxy-Model), as discussed herein. As can be seen in FIG. 8A, the linear fit and $R^2$ fit in the key parameter correlation is better for the effective cell approximation shown in graph 800 than 802 is similar. Moreover, as illustrated in FIG. 8B, the acquired data and the modeled data fit well, e.g., with an MSE of approximately 0.3-0.4. Thus, as illustrated in FIGS. 8A and 8B, the effective cell approximation outperforms conventional pure machine learning techniques for measuring standard logic cells.

Figure 9:
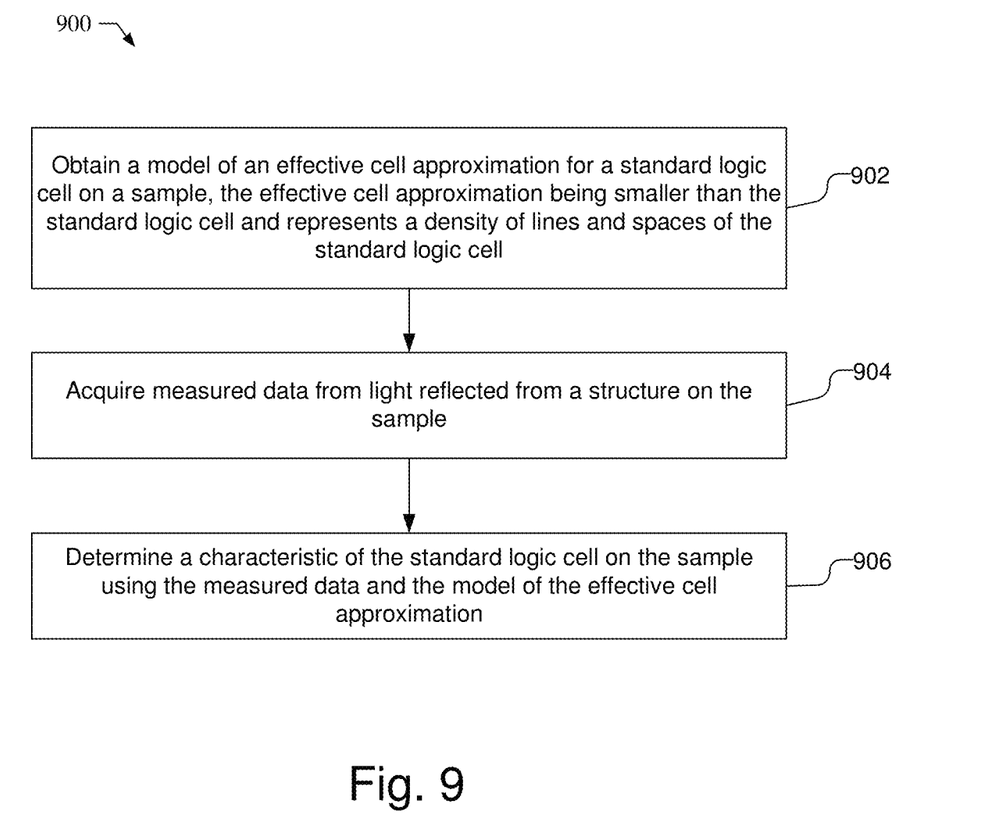
FIG. 9 is a flow chart illustrating a method of determining a characteristic of a standard logic cell on the sample using an effective cell approximation for the standard logic cell, which may be performed by an optical metrology device.

FIG. 9 is a flow chart 900 illustrating a method of determining a characteristic of a standard logic cell, e.g., a random logic cell, on the sample using an effective cell approximation for the standard logic cell, which may be performed by an optical metrology device, as discussed herein. As illustrated at block 902, data for an effective cell approximation for a standard logic cell on a sample is obtained, the effective cell approximation being smaller than the standard logic cell and represents a density of lines and spaces of the standard logic cell. The standard logic cell, for example, may include a multi-track layout with layers having non-periodic patterns. The standard logic cell with non-periodic patterns may be referred to as a random logic cell. The effective cell approximation may be an effective cell approximation model of the standard logic cell that may be obtained for example, from a library, e.g., stored in memory of the optical metrology device, or may be generated in real-time using rigorous modeling, such as RCWA, FDTD or FEM. The effective cell approximation may comprise a plurality of effective cell approximation metrology targets, each effective cell approximation metrology target having a variation in one or more variable parameters with respect to other effective cell approximation metrology targets, wherein the data for the effective cell approximation is obtained from a library. The data for the effective cell approximation may include variable parameters, such as one of line widths, line heights, sidewall angles, or a combination thereof. A means for obtaining data for an effective cell approximation for a standard logic cell on a sample, the effective cell approximation being smaller than the standard logic cell and represents a density of lines and spaces of the standard logic cell may include, e.g., a library stored in memory 664 and the processor 660 with dedicated hardware or implementing executable code or software instructions in memory 664 or and/or medium 669 in the optical metrology device 600.

At block 904, measured data is acquired from light reflected from a structure on the sample. In some implementations, the structure on the sample may be at least a portion of a logic structure that embodies the standard logic cell. Thus, measured data may be acquired from an in-die logic structure. In some implementations, the structure on the sample may be a metrology target that embodies the effective cell approximation for the standard logic cell. Thus, measured data may be acquired from a metrology target for the effective cell approximation metrology target that is in-die location or in-scribe location, e.g., as illustrated in FIG. 5. A means for acquiring measured data from light reflected from a structure on the sample may include, e.g., the light source 610 and detector 650, as well as the processor 660 with dedicated hardware or implementing executable code or software instructions in memory 664 or and/or medium 669 in the optical metrology device 600.

At block 906, a characteristic of the standard logic cell on the sample is determined using the measured data and the data for the effective cell approximation. For example, as illustrated in FIG. 5, where the effective cell approximation comprises an effective cell approximation model of the standard logic cell, the characteristic of the standard logic cell on the sample may be determined by acquiring calculated data from the effective cell approximation model and comparing the measured data and the calculated data, wherein at least one parameter of the effective cell approximation model is iteratively adjusted and corresponding calculated data is acquired and compared to the measured data until there is an acceptable fit, wherein the characteristic of the standard logic cell is determined to be the at least one parameter corresponding to the acceptable fit. The measured data and the calculated data, in some implementations may be at least one of spectral data or ellipsometric data. A means for determining a characteristic of the standard logic cell on the sample using the measured data and the data for the effective cell approximation may include, e.g., a library stored in memory 664 and the processor 660 with dedicated hardware or implementing executable code or software instructions in memory 664 or and/or medium 669 in the optical metrology device 600.

In some implementations, the effective cell approximation may be based on a selected area of the standard logic cell and may include non-periodic patterns of the selected area of the standard logic cell, e.g., as illustrated in FIG. 3. In other implementations, the effective cell approximation may represent non-periodic patterns in the standard logic cell using periodic patterns having a same density of lines and spaces as the standard logic cell, e.g., as illustrated in FIG. 4. For example, the effective cell approximation of the standard logic cell may represent structures in the effective cell approximation based on design rules for the standard logic cell. In some implementations, the periodic patterns in the effective cell approximation does not match patterns in any region of the standard logic cell.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
producing, with a light source, light that is incident on and reflected by a sample;
receiving, with at least one detector, the light after it is reflected by the sample;
obtaining, with at least one processor, data for an effective cell approximation for a standard logic cell on a sample; the effective cell approximation being smaller than the standard logic cell and represents a density of lines and spaces of the standard logic cell;
acquiring measured data from the light reflected from a structure on the sample; and
determining a characteristic of the standard logic cell on the sample using the measured data and the data for the effective cell approximation.

2. The method of claim 1, wherein the effective cell approximation is based on a selected area of the standard logic cell and includes non-periodic patterns of the selected area of the standard logic cell.

3. The method of claim 1, wherein the effective cell approximation represents non-periodic patterns in the standard logic cell using periodic patterns having a same density of lines and spaces as the standard logic cell.

4. The method of claim 3, wherein the effective cell approximation of the standard logic cell represents structures in the effective cell approximation based on design rules for the standard logic cell.

5. The method of claim 3, wherein the periodic patterns in the effective cell approximation does not match patterns in any region of the standard logic cell.

6. The method of claim 1, wherein the structure on the sample comprises at least a portion of a logic structure that embodies the standard logic cell.

7. The method of claim 1, wherein the structure on the sample comprises a metrology target that embodies the effective cell approximation for the standard logic cell.

8. The method of claim 1, wherein the standard logic cell comprises a multi-track layout with layers having non-periodic patterns.

9. The method of claim 1, wherein the data for the effective cell approximation comprises variable parameters comprising at least one of line widths, line heights, sidewall angles, or a combination thereof.

10. The method of claim 1, wherein the effective cell approximation comprises an effective cell approximation model of the standard logic cell obtained from a library or generated in real-time using rigorous modeling.

11. The method of claim 10, wherein determining the characteristic of the standard logic cell on the sample using the measured data and the data for the effective cell approximation comprises:
acquiring calculated data from the effective cell approximation model; and
comparing the measured data and the calculated data, wherein at least one parameter of the effective cell approximation model is iteratively adjusted and corresponding calculated data acquired and compared to the measured data until there is an acceptable fit, wherein the characteristic of the standard logic cell is determined to be the at least one parameter corresponding to the acceptable fit.

12. The method of claim 11, wherein the measured data and the calculated data comprise at least one of spectral data or ellipsometric data.

13. The method of claim 1, wherein the effective cell approximation comprises a plurality of effective cell approximation metrology targets, each effective cell approximation metrology target having a variation in one or more variable parameters with respect to other effective cell approximation metrology targets, wherein the data for the effective cell approximation is obtained from a library.

14. An optical metrology device comprising:
a light source that produces light that is incident on and reflected by a sample;
at least one detector that receives the light after it is reflected by the sample;
at least one processor coupled to the at least one detector, wherein the at least one processor is configured to:
obtain data for an effective cell approximation for a standard logic cell on the sample, the effective cell approximation being smaller than the standard logic cell and represents a density of lines and spaces of the standard logic cell;
acquire measured data from the light reflected from a structure on the sample; and
determine a characteristic of the standard logic cell on the sample using the measured data and the data for the effective cell approximation.

15. The optical metrology device of claim 14, wherein the effective cell approximation is based on a selected area of the standard logic cell and includes non-periodic patterns of the selected area of the standard logic cell.

16. The optical metrology device of claim 14, wherein the effective cell approximation represents non-periodic patterns in the standard logic cell using periodic patterns having a same density of lines and spaces as the standard logic cell.

17. The optical metrology device of claim 14, wherein the structure on the sample comprises at least a portion of a logic structure that embodies the standard logic cell.

18. The optical metrology device of claim 14, wherein the structure on the sample comprises a metrology target that embodies the effective cell approximation for the standard logic cell.

19. The optical metrology device of claim 14, wherein the effective cell approximation comprises an effective cell approximation model of the standard logic cell and wherein the at least one processor is configured to determine the characteristic of the standard logic cell on the sample using the measured data and the data for the effective cell approximation by being configured to:
- acquire calculated data from the effective cell approximation model;
- compare the measured data and the calculated data; and
- iteratively adjust at least one parameter of the effective cell approximation model and acquire and compare corresponding calculated data to the measured data until there is an acceptable fit, wherein the characteristic of the standard logic cell is determined to be the at least one parameter corresponding to the acceptable fit.

20. An optical metrology device comprising:
- a light source that produces light that is incident on and reflected by a sample;
- at least one detector that receives the light after it is reflected by the sample;
- means for obtaining data for an effective cell approximation for a standard logic cell on the sample, the effective cell approximation being smaller than the standard logic cell and represents a density of lines and spaces of the standard logic cell;
- means for acquiring measured data from the light reflected from a structure on the sample; and
- means for determining a characteristic of the standard logic cell on the sample using the measured data and the data for the effective cell approximation.

* * * * *